(12) United States Patent
Fogelström et al.

(10) Patent No.: US 12,100,176 B2
(45) Date of Patent: *Sep. 24, 2024

(54) CALIBRATION OF AN EYE TRACKING SYSTEM

(71) Applicant: Tobii AB, Danderyd (SE)

(72) Inventors: Per Fogelström, Danderyd (SE); Anna Redz, Danderyd (SE); Anders Dahl, Danderyd (SE); Niklas Ollesson, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,478

(22) Filed: Dec. 6, 2022

(65) Prior Publication Data

US 2023/0101049 A1 Mar. 30, 2023

Related U.S. Application Data

(63) Continuation of application No. 17/242,908, filed on Apr. 28, 2021, now Pat. No. 11,568,560.

(30) Foreign Application Priority Data

Apr. 28, 2020 (SE) .................... 2030142-0

(51) Int. Cl.
*G06T 7/70* (2017.01)
*G06V 20/59* (2022.01)
*G06V 40/18* (2022.01)

(52) U.S. Cl.
CPC .............. *G06T 7/70* (2017.01); *G06V 20/597* (2022.01); *G06V 40/193* (2022.01); *G06T 2207/30201* (2013.01)

(58) Field of Classification Search
CPC ... G06T 7/70; G06T 2207/30201; G06T 7/75; G06T 7/251; G06V 20/597; G06V 40/193; G06V 40/18; G06F 3/013
See application file for complete search history.

(56) References Cited

U.S. PATENT DOCUMENTS 9,940,518 B1 4/2018 Klingstrom et al.
2014/0211995 A1* 7/2014 Model .................... G06F 3/013
382/103

(Continued)

FOREIGN PATENT DOCUMENTS

KR 101914190 B1 11/2018
WO 2018000020 A1 1/2018

OTHER PUBLICATIONS

U.S. Appl. No. 17/242,908, "Non-Final Office Action", filed Jun. 3, 2022, 11 pages.

(Continued)

*Primary Examiner* — Md K Talukder
(74) *Attorney, Agent, or Firm* — Norens Patentbyrå AB

(57) ABSTRACT

There is provided mechanisms for calibration of an eye tracking system. An eye tracking system comprises a pupil centre corneal reflection (PCCR) based eye tracker and a non-PCCR based eye tracker. A method comprises obtaining at least one first eye position of a subject by applying the PCCR based eye tracker on an image set depicting the subject. The method comprises calibrating a head model of the non-PCCR based eye tracker, as applied on the image set, for the subject using the obtained at least one first eye position from the PCCR based eye tracker as ground truth. The head model comprises facial features that include at least one second eye position. The calibrating involves positioning the head model in order for its at least one (Continued)

second eye position to be consistent with the at least one first eye position given by the PCCR based eye tracker.

18 Claims, 6 Drawing Sheets

(56) References Cited

U.S. PATENT DOCUMENTS

| | | | | |
|---|---|---|---|---|
| 2016/0029883 | A1* | 2/2016 | Cox | G06V 40/19 |
| | | | | 351/209 |
| 2016/0063303 | A1* | 3/2016 | Cheung | G06V 40/193 |
| | | | | 382/103 |
| 2016/0066782 | A1* | 3/2016 | Kimura | G06F 3/013 |
| | | | | 351/210 |
| 2018/0239427 | A1* | 8/2018 | Hakoshima | G06T 7/73 |
| 2019/0156100 | A1* | 5/2019 | Rougeaux | G06F 3/013 |
| 2020/0074896 | A1* | 3/2020 | Kusafuka | G02B 30/30 |
| 2021/0345923 | A1* | 11/2021 | Fogelström | A61B 5/18 |
| 2021/0350565 | A1* | 11/2021 | Fogelström | G06T 7/70 |
| 2022/0050521 | A1* | 2/2022 | Drozdov | G06V 40/193 |

OTHER PUBLICATIONS

U.S. Appl. No. 17/242,908 , "Notice of Allowance", filed Sep. 14, 2022, 9 pages.

Swedish Patent Application No. SE2030142-0 , "Written Opinion", Dec. 2, 2020.

* cited by examiner

CALIBRATION OF AN EYE TRACKING SYSTEM

CROSS-REFERENCES TO RELATED APPLICATIONS

This application is a continuation of and claims priority to and the benefit of U.S. patent application Ser. No. 17/242,908, filed Apr. 28, 2021, entitled "CALIBRATION OF AN EYE TRACKING SYSTEM" which claims priority to Swedish Patent Application No. 2030142.0, filed Apr. 28, 2020, the entire contents of which are hereby incorporated by reference in their entirety and for all purposes.

TECHNICAL FIELD

Embodiments presented herein relate to a method, an eye tracking system, a computer program, and a computer program product for calibration of the eye tracking system.

BACKGROUND

Eye tracking is a sensor technology that makes it possible for a computer or other device to know where a subject, such as a person, is looking. An eye tracker can detect the presence, attention and focus of the user. Eye tracking need not necessarily involve tracking of the user's gaze (for example in the form of a gaze direction or a gaze point). Eye tracking may for example relate to tracking of the position of an eye of the subject in space, without actually tracking a gaze direction or gaze point of the eye.

Different techniques have been developed for monitoring in which direction (or at which point on a display) a subject, such as person, is looking. This is often referred to as gaze tracking. Such techniques often involve detection of certain features in images of the eye, and a gaze direction or gaze point is then computed based on positions of these detected features. An example of such a gaze tracking technique is pupil center corneal reflection (PCCR). PCCR based gaze tracking employs the position of the pupil center and the position of glints (reflections of illuminators at the cornea) to compute a gaze direction of the eye or a gaze point at a display.

As an alternative (or complement) to conventional techniques such as PCCR-based eye tracking, machine learning may be employed to train an algorithm to perform eye tracking. For example, the machine learning may employ training data in the form of images of the eye and associated known gaze points to train the algorithm, so that the trained algorithm can perform eye tracking in real time based on images of the eye. Plenty of training data is typically needed for such machine learning to work properly. The training data may take quite some time and/or resources to collect. In many cases, certain requirements may be put on the training data. The training data should for example preferably reflect all those types of cases/scenarios that the eye tracking algorithm is supposed to be able to handle. If only certain types of cases/scenarios are represented in the training data (for example only small gaze angles, or only well-illuminated images), then the eye tracking algorithm may perform well for such cases/scenarios, but may not perform that well for other cases/scenarios not dealt with during the training phase.

Hence, each type of eye tracker comes with its own advantages and disadvantages. However, regardless of which type of eye tracker is used, there is a risk that the performance of the eye tracker will be inaccurate, for example due to insufficient calibration.

It would be desirable to provide new ways to address one or more of the abovementioned issues.

SUMMARY

An object of embodiments herein is to address one or more of the issues noted above.

According to a first aspect there is presented a method for calibration of an eye tracking system. The eye tracking system comprises a PCCR based eye tracker and a non-PCCR based eye tracker. The method comprises obtaining at least one first eye position of a subject by applying the PCCR based eye tracker on an image set depicting the subject. The method comprises calibrating a head model of the non-PCCR based eye tracker, as applied on the image set, for the subject using the obtained at least one first eye position from the PCCR based eye tracker as ground truth. The head model comprises facial features that include at least one second eye position. The calibrating involves positioning the head model in order for its at least one second eye position to be consistent with the at least one first eye position given by the PCCR based eye tracker.

According to a second aspect there is presented an eye tracking system. The eye tracking system comprises a PCCR based eye tracker and a non-PCCR based eye tracker. The eye tracking system being configured to obtain at least one first eye position of a subject by applying the PCCR based eye tracker on an image set depicting the subject. The eye tracking system being configured to calibrate a head model of the non-PCCR based eye tracker, as applied on the image set, for the subject using the obtained at least one first eye position from the PCCR based eye tracker as ground truth. The head model comprises facial features that include at least one second eye position. The calibrating involves positioning the head model in order for its at least one second eye position to be consistent with the at least one first eye position given by the PCCR based eye tracker.

According to a third aspect there is presented an eye tracking system. The eye tracking system comprises a PCCR based eye tracker and a non-PCCR based eye tracker. The eye tracking system further comprises an obtain module configured to obtain at least one first eye position of a subject by applying the PCCR based eye tracker on an image set depicting the subject. The eye tracking system further comprises a calibrate module configured to calibrate a head model of the non-PCCR based eye tracker, as applied on the image set, for the subject using the obtained at least one first eye position from the PCCR based eye tracker as ground truth. The head model comprises facial features that include at least one second eye position. The calibrating involves positioning the head model in order for its at least one second eye position to be consistent with the at least one first eye position given by the PCCR based eye tracker.

According to a fourth aspect there is presented a computer program for calibration of an eye tracking system, the computer program comprising computer program code which, when run on an eye tracking system, causes the eye tracking system to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient calibration of the eye tracking system Advantageously, the herein disclosed calibration results in the estimation error of the non-PCCR based eye tracker to be within tolerable levels.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
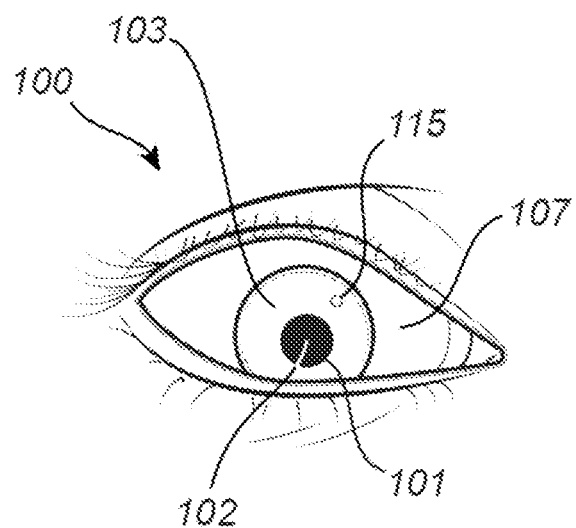
FIG. 1 is a front view of an eye.
Figure 2:
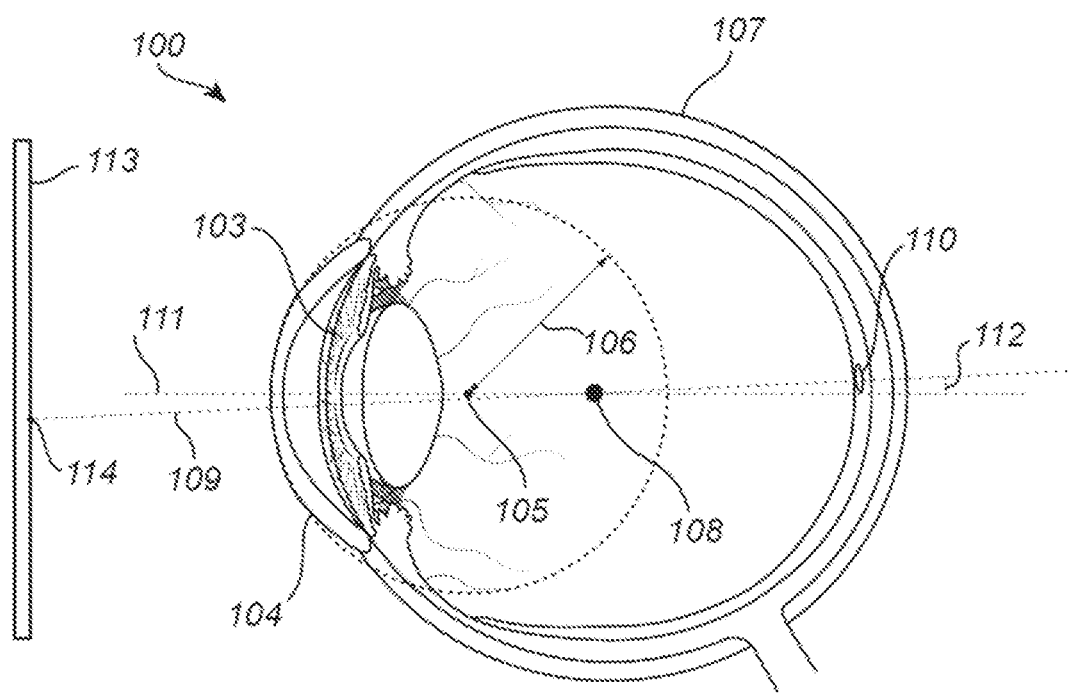
FIG. 2 is a cross sectional view of the eye from FIG. 1 from the side of the eye.

Certain features of an eye will be described with parallel references to FIG. 1 and FIG. 2. FIG. 1 is a front view of an eye 100. FIG. 2 is a cross sectional view of the eye 100 from the side of the eye 100. While FIG. 2 shows more or less the entire eye 100, the front view presented in FIG. 1 only shows those parts of the eye 100 which are typically visible from in front of a person's face. The eye 100 has a pupil 101, which has a pupil center 102. The eye 100 also has an iris 103 and a cornea 104. The cornea 104 is located in front of the pupil 101 and the iris 103. The cornea 104 is curved and has a center of curvature 105 which is referred to as the center 105 of corneal curvature, or simply the cornea center 105. The cornea 104 has a radius of curvature 106 referred to as the radius 106 of the cornea 104, or simply the cornea radius 106. The eye 100 also has a sclera 107. The eye 100 has a center 108 which may also be referred to as the center 108 of the eye ball, or simply the eye ball center 108. The visual axis 109 of the eye 100 passes through the center 108 of the eye 100 to the fovea 110 of the eye 100. The optical axis 111 of the eye 100 passes through the pupil center 102 and the center 108 of the eye 100. The visual axis 109 forms an angle 112 relative to the optical axis 111. The deviation or offset between the visual axis 109 and the optical axis 111 is often referred to as the fovea offset 112. In the example shown in FIG. 2, the eye 100 is looking towards a display 113, and the eye 100 is gazing at a gaze point 114 at the display 113. FIG. 1 also shows a reflection 115 of an illuminator at the cornea 104. Such a reflection 115 is also known as a glint 115.

Figure 3:
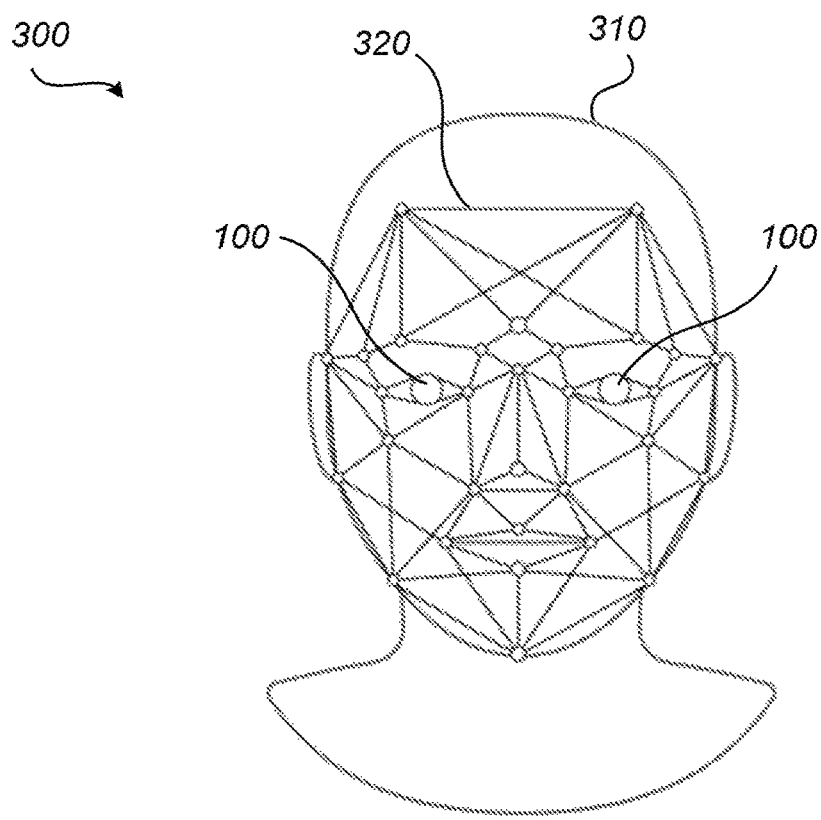
FIG. 3 schematically illustrates a face model as applied to a subject.

FIG. 3 at 300 schematically illustrates a face model 320 (provided as a polygonal face model) as applied to a subject 310 and where the face model 320 is matched to the positions of the eyes 100 of the subject 310. Such a face model 320 can be used by a non-PCCR based eye tracker.

Figure 4:
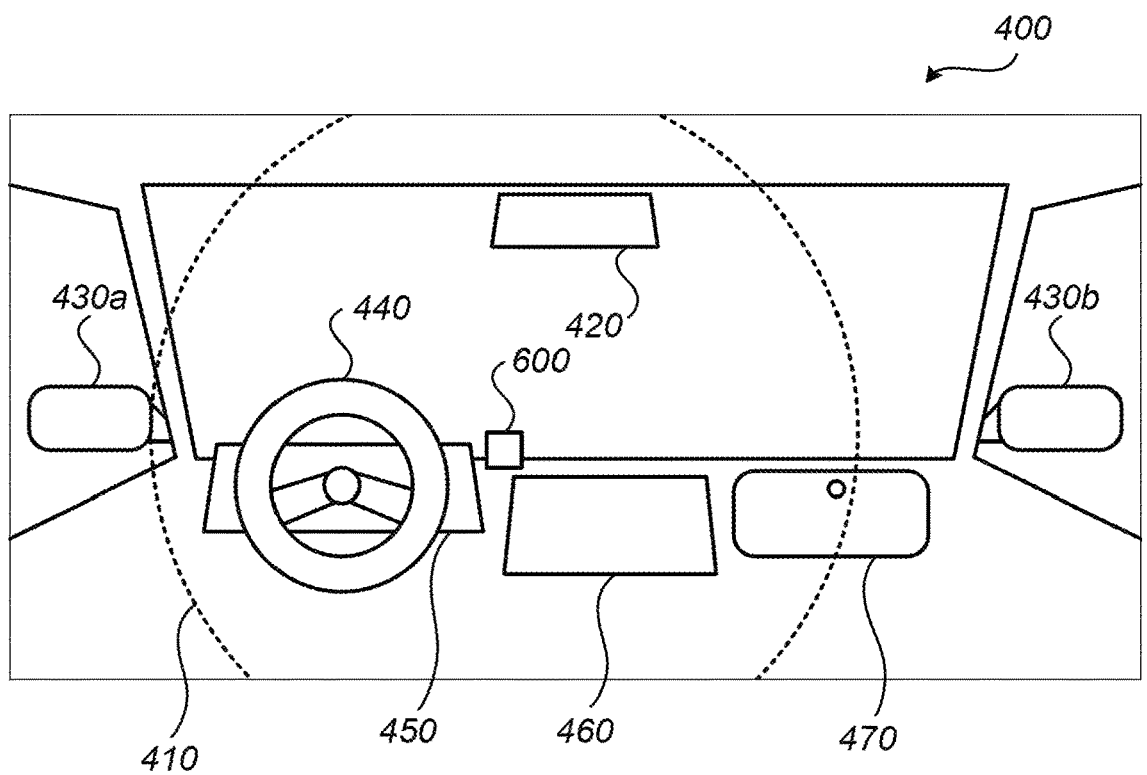
FIG. 4 schematically illustrates a vehicle interior according to an embodiment.

An example environment, in terms of a vehicle interior 400, where the herein disclosed embodiments are applicable is shown in FIG. 4. The vehicle interior 400 comprises display/view related features, such as an instrument panel (or heads-up display) 450, an entertainment panel 460, a left-wing mirror 430a, a right-wing mirror 430b, and a rear-view mirror 420. The vehicle interior 400 further comprises a steering wheel 440 and a glove compartment 470. As the skilled person understands, the vehicle interior 400 might comprise further features, details, meters, gauges, handles, etc.

The vehicle interior 400 further comprises an eye tracking system 600. The eye tracking system 600 comprises a PCCR based eye tracker and a non-PCCR based eye tracker. The vehicle interior 400 can be divided into possible gaze regions of a subject, such as a driver or passenger, positioned to interact with the vehicle interior 400.

In the illustrative example of FIG. 4, a first gaze region is defined by the interior of circle 410 and a second gaze region is defined by the exterior of circle 410.

The PCCR based eye tracker as illustrated in FIG. 4 has a field of view defined by the radius of the circle 410. However, it should be noted that the field of view of the PCCR based eye tracker in practice might have a shape which is slightly irregular. Further, the field of view may be elliptical, allowing higher haze angles horizontally than vertically, or have any other shape. The PCCR based eye tracker is thus unable to track the gaze of a subject, such as a driver or passenger, gazing at a position outside the circle 410. When the subject thus gazes outside the circle 410, only the non-PCCR based eye tracker can be used to track the gaze of the subject. Hence, for tracking a gaze in the first gaze region both the PCCR based eye tracker and the non-PCCR based eye tracker can be used whereas for tracking a gaze in the second gaze region only the non-PCCR based eye tracker can be used.

In some aspects the first gaze region is considered as a primary gaze region since it corresponds to a straight-ahead view, where the subject is a driver of the vehicle in which the vehicle interior 400 is placed and where the driver is looking at the road through the front windshield. This can be considered as a region of primary focus of the user, as it is expected that, when driving, the user will primarily be looking at the road. For the same reason, the second gaze region might be considered as a secondary gaze region.

It will be appreciated that the specific arrangement of the vehicle interior 400 is for example purposes only, and other arrangements of the vehicle interior 400 could equally be envisaged. It will also be appreciated that, whilst the vehicle interior 400 corresponding to a car is shown in FIG. 4, a similar vehicle interior 400 could be used in any vehicle comprising an eye tracking system 600 as hereinafter will be disclosed.

Issues with PCCR based eye trackers and non-PCCR based eye trackers have been noted above. Further considerations relating hereto will be disclosed next.

Gaze is basically a point in space where the gaze vector starts; the gaze origin, and a direction in space; the gaze direction. The gaze origin is often selected to be located somewhere inside the eye, but exactly where might differ across applications. For a PCCR based eye tracker the cornea center might be used to define the gaze origin. Alternatively, the eye rotation center (a few millimeters behind the cornea center) might be used as the gaze origin.

On the other hand, for a non-PCCR based eye tracker, the estimation error according to state-of-the-art calibration mechanisms is generally larger. The estimation error might thus be of a magnitude not tolerable in many eye tracking, or gaze tracking, applications.

With reference again to FIG. 4, outside the circle 410 it is only possible to use the non-PCCR based eye tracker to track the eye position, or gaze, of the subject 310. Using state-of-the-art mechanisms to calibrate the non-PCCR based eye tracker might result in intolerable estimation errors. Further, when the PCCR based eye tracker is used to track the eye position, or gaze, of the subject 310 inside the circle 410, there might be a possible jump in eye position, or gaze, tracking of the subject 310 as the gaze moves between the interior of the circle 410 and the exterior of the circle 410. This is a consequence of a switch being made between using the PCCR based eye tracker and the non-PCCR based eye tracker. One reason for this is that for the non-PCCR based eye tracker commonly is based on a combination of head pose from facial landmarks and pupil/iris detection for providing an estimate of the gaze. This requires some assumptions about the head geometry of the subject 310, such as head size, which will vary from subject to subject and thus cause estimation errors.

The embodiments disclosed herein relate to mechanisms for calibration of an eye tracking system 600. In order to obtain such mechanisms there is provided an eye tracking system 600, a method performed by the eye tracking system 600, a computer program product comprising code, for example in the form of a computer program, that when run on an eye tracking system 600, causes the eye tracking system 600 to perform the method.

Figure 5:
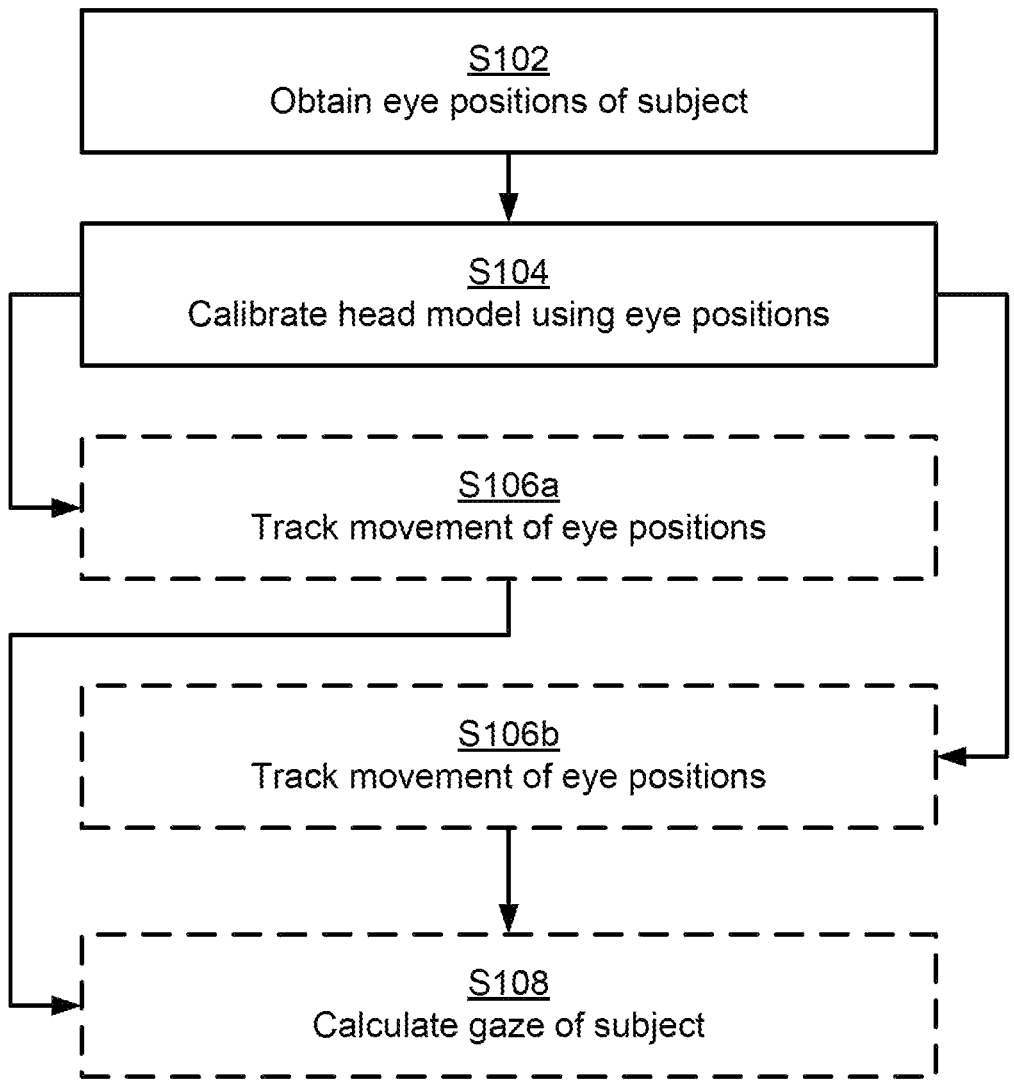
FIG. 5 is a flowchart of methods according to embodiments.

FIG. 5 is a flowchart illustrating embodiments of methods for calibration of an eye tracking system 600. The methods are performed by the eye tracking system 600. The eye tracking system 600 comprises a PCCR based eye tracker 610 and a non-PCCR based eye tracker 630. The methods are advantageously provided as computer programs 1020.

At least some of the herein disclosed embodiments are based on using eye position information obtained by the PCCR based eye tracker 610 as ground truth to calibrate the non-PCCR based eye tracker 630, for example in order to get more accurate gaze estimations using the non-PCCR based eye tracker 630. It is thus assumed that the PCCR based eye tracker 610 is used as reference. Hence, the eye tracking system 600 is configured to perform step S102:

S102: The eye tracking system 600 obtains at least one first eye position 104 of a subject 310 by applying the PCCR based eye tracker 610 on an image set 605 depicting the subject 310.

In some examples the image set 605 comprises a sequence of images depicting the subject 310. In other aspects the image set 605 comprises a single image of the subject 310. The image set 605 might thus either be composed of a sequence of digital image frames or a single such digital image frame.

Information of the at least one first eye position 104 of the subject 310 as obtained using the PCCR based eye tracker 610 is then used to calibrate the non-PCCR based eye tracker 630. In particular, the eye tracking system 600 is configured to perform step S104:

S104: The eye tracking system 600 calibrates a head model of the non-PCCR based eye tracker 630, as applied on the image set 605, for the subject 310 using the obtained at least one first eye position 104 from the PCCR based eye tracker 610 as ground truth. The head model comprises facial features that include at least one second eye position 101. The calibrating involves positioning the head model in order for its at least one second eye position 101 to be consistent with the at least one first eye position 104 given by the PCCR based eye tracker 610.

Advantageously, the calibration of the non-PCCR based eye tracker 630 using the PCCR based eye tracker 610 allows the non-PCCR based eye tracker 630 to be used for accurate eye position, or gaze, tracking of the subject 310 when the PCCR based eye tracker 610 is unavailable or unable to track the position, or gaze, of the subject 310.

Advantageously, the calibration of the non-PCCR based eye tracker 630 using the PCCR based eye tracker 610 reduces possible jumps in eye position, or gaze, tracking of the subject 310 as a switch is made between using the PCCR based eye tracker 610 and the non-PCCR based eye tracker 630.

Embodiments relating to further details of calibration of an eye tracking system 600 as performed by the eye tracking system 600 will now be disclosed.

There could be different ways in which the at least one first eye position 104 is represented by the PCCR based eye tracker 610 and the at least one second eye position 101 is represented by the non-PCCR based eye tracker 630. In some embodiments, the at least one first eye position 104 is represented by cornea positions of the subject 310, and the at least one second eye position 101 is represented by pupil positions of the subject 310.

There could be different ways in which the head model is positioned in order for its at least one second eye position 101 to be consistent with the at least one first eye position 104 given by the PCCR based eye tracker 610. In some embodiments, positioning the head model to match its at least one second eye position 101 to the at least one first eye position 104 given by the PCCR based eye tracker 610 involves any of rotating, translating, and/or scaling the head model. Further in this respect, could be different ways in which the head parameters could be updated, and thus the non-PCCR based eye tracker 630 be calibrated, when information of the cornea position(s) is available. For example, the head model could be matched such that its eye position(s) match the gaze origin (defined by the cornea center) as provided by the PCCR based eye tracker 610. For example, the head parameters could be updated based on the fact that the gaze vectors over time should always intersect with the same point on the face or by any other method of updating the head parameters that would be known to the skilled person, such as presented by Strupczewski et al. in "Geometric Eye Gaze Tracking", Proceedings of the 11th Joint Conference on Computer Vision, Imaging and Computer Graphics Theory and Applications (VISIGRAPP 2016)—Volume 3: VISAPP, pages 446-457. Further, calibrating the head model might involve updating geometry parameters of the facial features. As an example, at least one of the following distance parameters might be updated: center between eyes to eye rotation center (x, y and z direction), center of eye corners to eye rotation center (x, y and z direction), interpupillary distance, and distance from pupil to eye rotation center.

In some aspects, the tracked movement of the at least one first eye position 104 of the subject 310 or the tracked movement of the at least one second eye position 101 and/or head pose of the subject 310 is used to calculate the gaze of the subject 310. In particular, in some embodiments, the eye tracking system 600 is configured to perform (optional) step S108:

S108: The eye tracking system 600 calculates gaze of the subject 310 in the image set 605.

The gaze is calculated using the PCCR based eye tracker 610 or the non-PCCR based eye tracker 630. Further aspects relating thereto will be disclosed next.

In some embodiments, the gaze is calculated using the PCCR based eye tracker 610 and the eye tracking system 600 is configured to perform (optional) step S106a:

S106a: The eye tracking system 600 tracks movement of the at least one first eye position 104 (or cornea position(s)) of the subject 310 in the image set 605 using the PCCR based eye tracker 610.

The gaze of the subject 310 is then in S108 calculated using the tracked movement of the at least one first eye position 104 of the subject 310 using the PCCR based eye tracker 610.

In some embodiments, the gaze is calculated using the non-PCCR based eye tracker 630 and the eye tracking system 600 is configured to perform (optional) step S106a:

S106b: The eye tracking system 600 tracks movement of the at least one second eye position 101 (or pupil position(s)) of the subject 310 in the image set 605 using the non-PCCR based eye tracker 630.

The gaze of the subject 310 is then calculated using the tracked movement of the at least one second eye position 101 and/or head pose of the subject 310 using the non-PCCR based eye tracker 630.

There could be different ways to select between using the PCCR based eye tracker 610 and using the non-PCCR based eye tracker 630 for calculating the gaze. In some examples, movement of the at least one second eye position 101 of the subject 310 in the image set 605 is tracked using the non-PCCR based eye tracker 630 when the PCCR based eye tracker 610 is unable to track movement of the at least one first eye position 104. In other examples, the PCCR based eye tracker 610 is available but for some reason less accurate than the non-PCCR based eye tracker 630, or the non-PCCR based eye tracker 630 is preferred for other reasons than accuracy.

There could be different reasons as to why the PCCR based eye tracker 610 is unable to track movement of the at least one first eye position 104. In some examples, the PCCR based eye tracker 610 is determined to be unable to track movement of the at least one first eye position 104 by no glints 115 being obtainable by the PCCR based eye tracker 610. In further examples, the PCCR based eye tracker 610 is determined to be unable to track movement of the at least one first eye position 104 by too many glints being detected (for example due to unwanted reflections, etc.), for example by more glints 115 being obtainable by the PCCR based eye tracker 610 than the number of illuminators illuminating an eye 100 of the subject 310, or by the correct number of glints being detected, but the glint pattern being illogical in view of the position of the illuminators (i.e. the glint matching process produces incorrect results), that is, where an illuminator pattern, introduced by the positions of the illuminators illuminating the eye, does not match a pattern of the glints 115 in the eye 100 of the subject 310.

In some aspects, the PCCR based eye tracker 610 has a more narrow field of view than the non-PCCR based eye tracker 630. In general terms, the field of view of the PCCR based eye tracker 610 can be defined by the radius of a circle, such as circle 410 in FIG. 4. The PCCR based eye tracker 610 might then be used to track the gaze of the subject 310 inside the circle 410 whilst the non-PCCR based eye tracker 630 is used to track the gaze of the subject 310 outside the circle 410. That is, in some embodiments, the PCCR based eye tracker 610 is unable to track movement of the at least one first eye position 104 when the subject 310 gazes at points located outside the circle 410. The PCCR based eye tracker 610 is then used to track movement of the at least one first eye position 104 of the subject 310 when the subject 310 gazes at points located inside the circle 410, whereas the non-PCCR based eye tracker 630 is used to track movement of the at least one second eye position 101 of the subject 310 when the subject 310 gazes at points located outside the circle 410.

There could be different examples of non-PCCR based eye trackers 630. In some examples the non-PCCR based eye tracker 630 is based on tracking head pose and pupil or head pose and iris. From head pose the gaze origin(s), in terms of eye position or eye ball centre or cornea centre, can be calculated as known positions relative to the head. The gaze direction might then be set so that it passes through the pupil as seen in the image capturing unit. In some examples the non-PCCR based eye tracker 630 is based on tracking facial features, including, but not necessarily limited to, iris and pupil, and performing machine learning. Based on data with known gaze angles (as provided by means of known gaze stimulus), a network can be trained to infer gaze from the facial features. In some examples the non-PCCR based eye tracker 630 is based on end-to-end machine learning, where a network is trained based on images with known gaze angles (as provided by means of known gaze stimulus) to infer gaze. In some examples the non-PCCR based eye tracker 630 is based on tracking pupil or iris projection in the image capturing unit. For larger gaze angles from the image capturing unit the projection of the pupil on the sensor of the image capturing unit will be more elliptic than for smaller angles. This gives the gaze direction. Gaze origin, in terms of eye position or eye ball centre or cornea centre, can be calculated from e.g. a known head pose.

Figure 6:
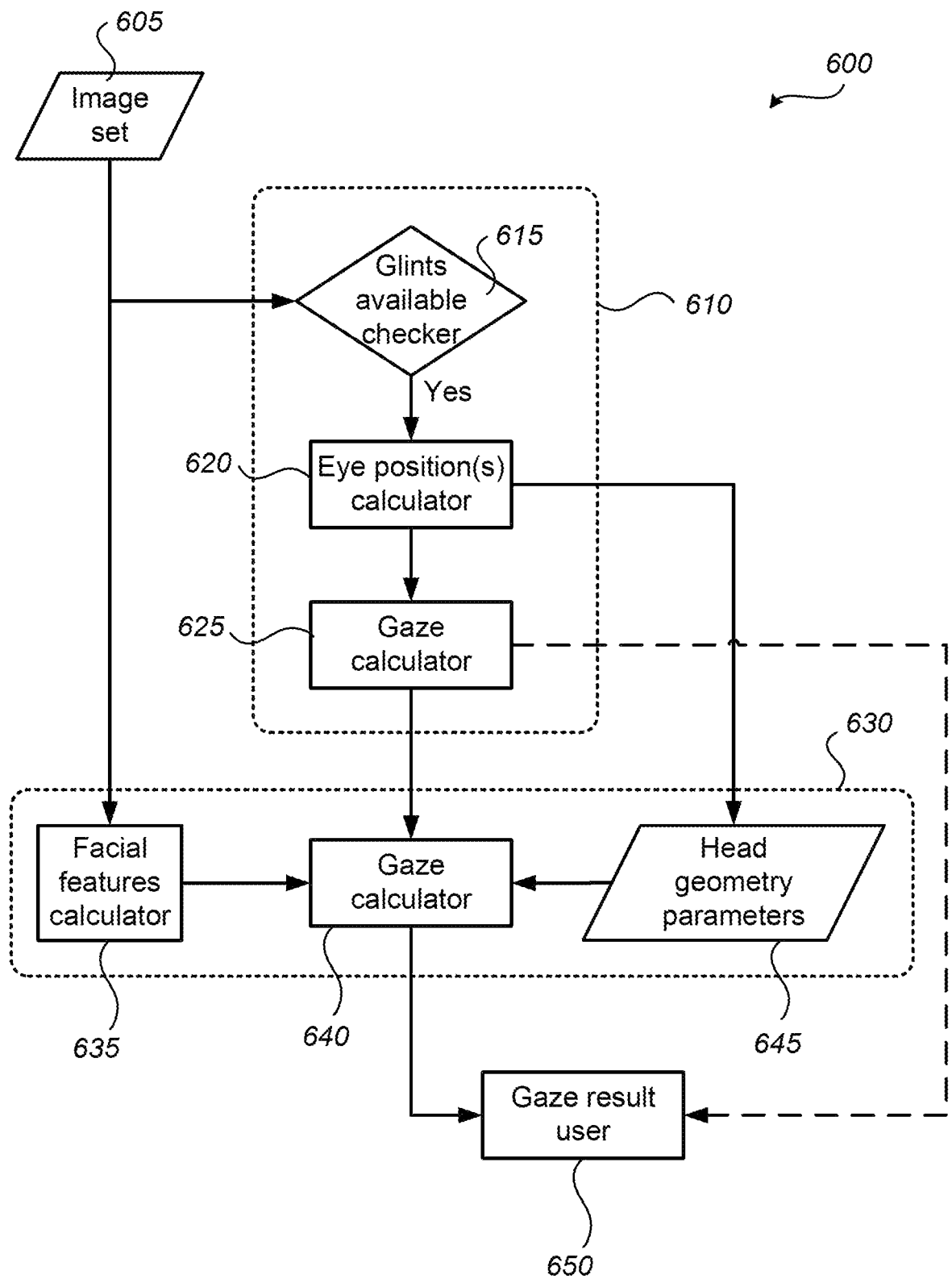
FIG. 6 schematically illustrates an eye tracking system according to an embodiment.

One particular method for calibration of an eye tracking system 600 based on at least some of the embodiments disclosed above will now be disclosed with reference to FIG. 6. FIG. 6 schematically illustrates an eye tracking system 600 that comprises a PCCR based eye tracker 610 and a non-PCCR based eye tracker 630. The PCCR based eye tracker 610 and the non-PCCR based eye tracker 630 operate on an image set 605 which, as disclosed above, might comprise one or more digital images depicting the subject 310.

Details of the PCCR based eye tracker 610 will now be disclosed. A glints available checker module 615 is configured to check whether or not an image of the image set 605 comprises at least one glint of the depicted subject 310. In case the image comprises a glint of the depicted subject 310, the image is provided to an eye position(s) calculator module 620. The eye position(s) calculator module 620 is configured to calculate the eye position(s) of the depicted subject 310 using the one or more glints. Information of the eye position(s) is provided to a gaze calculator module 625 as well as to a head geometry positions module 645 at the non-PCCR based eye tracker 630. The eye position(s) can thereby be used to update head geometry parameters as stored in the head geometry positions module 645. The gaze calculator module 625 is configured to calculate the gaze of the subject 310 using the information of the eye position(s). Information of the thus calculated gaze is provided to a gaze calculator module 640 at the non-PCCR based eye tracker 630, and optionally to a gaze result user module 650. In some examples the eye position(s) are cornea position(s).

Details of the non-PCCR based eye tracker 630 will now be disclosed. A facial features calculator module 635 is configured to extract facial features of the depicted subject 310 by analyzing at least one image of the image set 605. The non-PCCR based eye tracker 630 uses the information of the cornea position(s) as provided from the cornea position(s) calculator module 620 to the calibrate the head geometry parameter module 645 such that eye positions of the subject 310 as given by the head geometry positions are matched to eye positions of the subject 310 as given by the cornea position(s). The thus calibrated head geometry parameters and the extracted facial features are then provided as input to a gaze calculator 640. The gaze calculator module 640 is configured to calculate the gaze of the subject 310 using the calibrated head geometry parameters and the extracted facial features. Information of the thus calculated gaze is provided to the gaze result user module 650.

The gaze result user module 650 is configured to use information of the gaze of the subject 310. For example, in case the eye tracking system 600 is part of a vehicle, or such as a vehicle interior 400, the gaze result user module 650 could be part of an advanced driver-assistance system (ADAS), a driver monitoring system (DMS), and/or a driver attention monitor (DAM) system, or the like.

Figure 7:
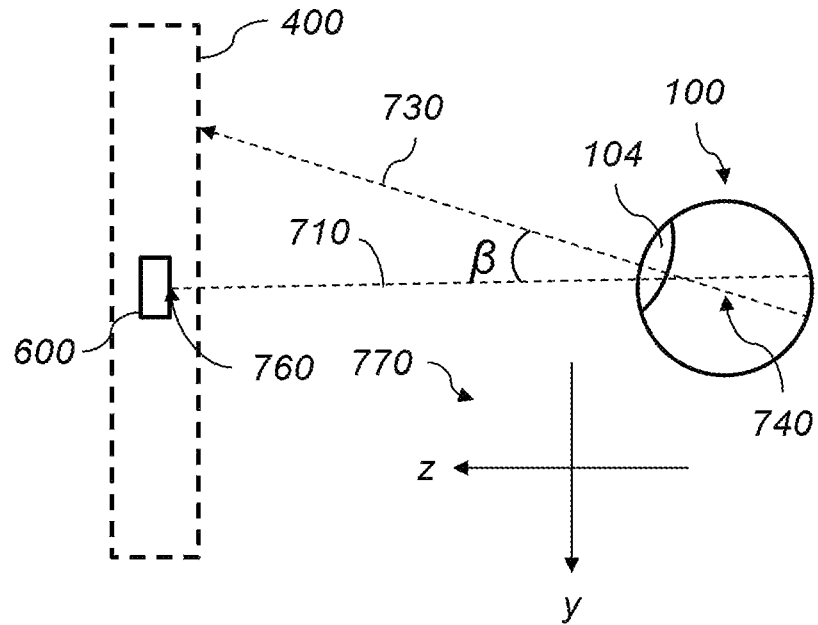
FIG. 7 schematically illustrates relation between eye position, gaze origin, gaze direction and gaze point.
Figure 7:
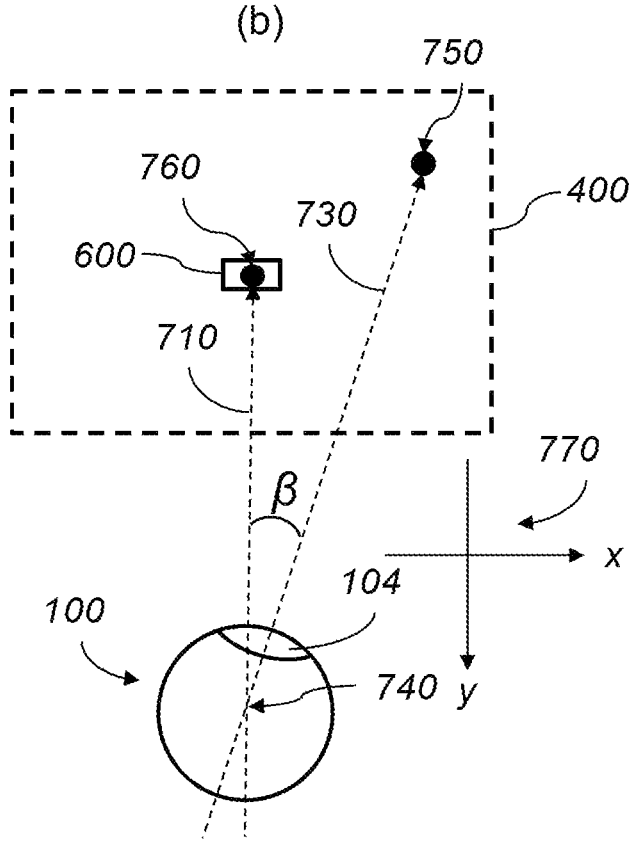

Further aspects of the relation between eye position, gaze origin, gaze direction and gaze point will now be disclosed with reference to FIG. 7 which at (a) and (b) schematically illustrates an eye 100 gazing at a vehicle interior 400 and where the gaze of the eye 100 is tracked by an eye tracking system 600. A gaze angle β is defined as the angle between an axis 710 of the eye tracking system 600 and a gaze direction 730 of the eye 100 of the subject. The axis 610 of the eye tracking system 600 is defined as a vector passing through a focal point 740 of the eye 100 and an origin 760 of coordinates of an internal coordinate system 770 of the eye tracking system 600. The gaze direction 730 of the eye 100 is defined as a vector passing through the focal point 740 of the eye 100 and a gaze point 750 of the eye 100 at the vehicle interior 400. The visual axis 109 of the eye 100, described in relation to FIG. 2 may be referred to as the gaze direction 730. The focal point 740 may be referred to as gaze origin and typically refers to the center of the eye 100, the center of the eye ball of the eye 100, or the center of the cornea 104 of the eye 100. In another example, any point in the eye 100 may be referred to as gaze origin. In yet another example, any point between the eyes 100 of the subject 310 may be referred to as gaze origin.

Figure 8:
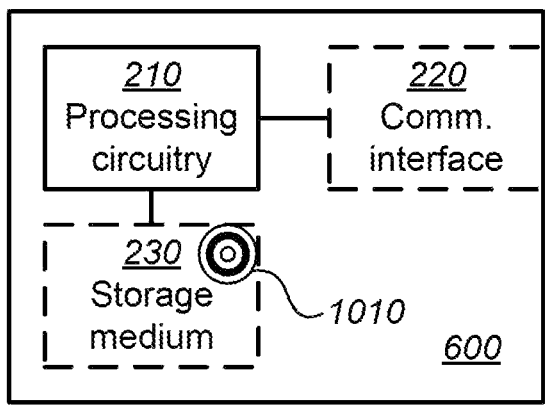
FIG. 8 is a schematic diagram showing functional units of an eye tracking system according to an embodiment.

FIG. 8 schematically illustrates, in terms of a number of functional units, the components of an eye tracking system 600 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the eye tracking system 600 to perform a set of operations, or steps, as disclosed above. For example, the storage medium 230 may store the set of operations, and the processing circuitry 210 may be configured to retrieve the set of operations from the storage medium 230 to cause the eye tracking system 600 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The eye tracking system 600 may further comprise a communications interface 220 at least configured for communications with other component, functions, nodes, modules, and devices, such as the gaze result user module 650. As such the communications interface 220 may comprise one or more transmitters and receivers, comprising analogue and digital components. The processing circuitry 210 controls the general operation of the eye tracking system 600 e.g. by sending data and control signals to the communications interface 220 and the storage medium 230, by receiving data and reports from the communications interface 220, and by retrieving data and instructions from the storage medium 230. Other components, as well as the related functionality, of the eye tracking system 600 are omitted in order not to obscure the concepts presented herein.

In some examples the eye tracking system 600 further comprises one or more image capturing units. The image capturing unit might be an image sensor or a camera, such as a charge-coupled device (CCD) camera or a Complementary Metal Oxide Semiconductor (CMOS) camera. However, other types of image capturing units are also be envisaged.

Figure 9:
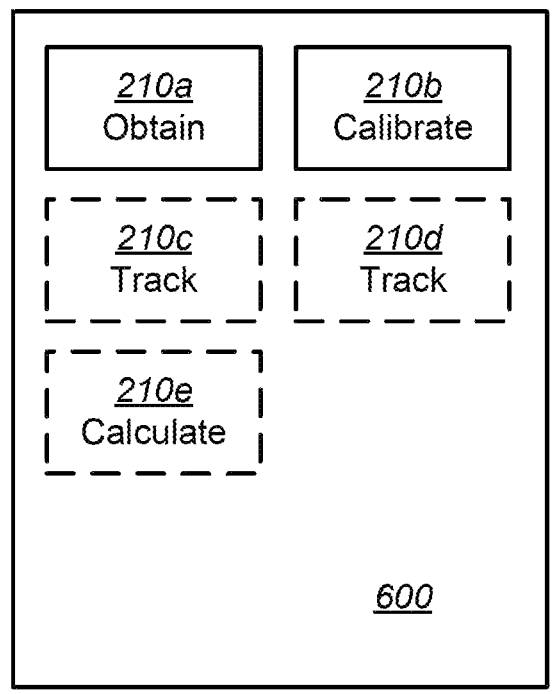
FIG. 9 is a schematic diagram showing functional modules of an eye tracking system according to an embodiment.

FIG. 9 schematically illustrates, in terms of a number of functional modules, the components of an eye tracking system 600 according to an embodiment. The eye tracking system 600 of FIG. 9 comprises a number of functional modules; an obtain module 210a configured to perform step S102, and a calibrate module 210b configured to perform step S104. The eye tracking system 600 of FIG. 9 may further comprise a number of optional functional modules, such as any of a track module 210c configured to perform step S106a, a track module 210d configured to perform step S106b, and a calculate module 210e configured to perform step S108. In general terms, each functional module 210a-210e may in one embodiment be implemented only in hardware and in another embodiment with the help of software, i.e., the latter embodiment having computer program instructions stored on the storage medium 230 which when run on the processing circuitry makes the eye tracking system 600 perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

The eye tracking system 600 may be provided as a standalone device or as a part of at least one further device. For example, the eye tracking system 600 might be provided in a vehicle. In particular, according to an embodiment, a vehicle is provided that comprises the eye tracking system 600 as herein disclosed. The vehicle might be a car, a cabin of a truck, etc. The subject 310 might then be a driver or a passenger of the vehicle.

Alternatively, functionality of the eye tracking system 600 may be distributed between at least two devices, or nodes. Thus, a first portion of the instructions performed by the eye tracking system 600 may be executed in a first device, and a second portion of the of the instructions performed by the eye tracking system 600 may be executed in a second device; the herein disclosed embodiments are not limited to any particular number of devices on which the instructions performed by the eye tracking system 600 may be executed. Hence, the methods according to the herein disclosed embodiments are suitable to be performed by an eye tracking system 600 residing in a cloud computational environment. Therefore, although a single processing circuitry 210 is illustrated in FIG. 8 the processing circuitry 210 may be distributed among a plurality of devices, or nodes. The same applies to the functional modules 210a-210e of FIG. 9 and the computer program 1020 of FIG. 10.

Figure 10:
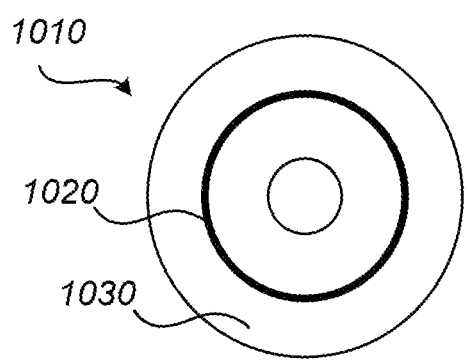
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

What is claimed is:

1. An eye tracking system, the eye tracking system comprising a pupil centre corneal reflection (PCCR) based eye tracker and a non-PCCR based eye tracker, wherein the PCCR based eye tracker is unable to track movement of the at least one first eye position when a subject gazes at points located outside a field of view of the PCCR based eye tracker, wherein the PCCR based eye tracker is used to track movement of a at least one first eye position of the subject when the subject gazes at points located within a field of view of the PCCR based eye tracker, and wherein the non-PCCR based eye tracker is used to track movement of a at least one second eye position of the subject when the subject gazes at points located outside the field of view of the PCCR based eye tracker, the eye tracking system being configured to:
   obtain at least one first eye position of a subject by applying the PCCR based eye tracker on an image set depicting the subject; and
   calibrate a head model of the non-PCCR based eye tracker, as applied on the image set, for the subject using the obtained at least one first eye position from the PCCR based eye tracker as ground truth, wherein the head model comprises facial features that include at least one second eye position, and wherein the calibrating involves positioning the head model in order for its at least one second eye position to be consistent with the at least one first eye position given by the PCCR based eye tracker.

2. The method according to claim 1, wherein the at least one first eye position is represented by cornea positions of the subject, and wherein the at least one second eye position is represented by pupil positions of the subject.

3. The eye tracking system according to claim 1, further being configured to: calculate gaze of the subject in the image set using the PCCR based eye tracker or the non-PCCR based eye tracker.

4. The eye tracking system according to claim 3, further being configured to:
   track movement of the at least one first eye position of the subject in the image set using the PCCR based eye tracker,
   wherein the gaze of the subject is calculated using the tracked movement of the at least one first eye position of the subject using the PCCR based eye tracker.

5. The eye tracking system according to claim 3, further being configured to:
   track movement of the at least one second eye position of the subject in the image set using the non-PCCR based eye tracker,
   wherein the gaze of the subject is calculated using the tracked movement of the at least one second eye position and/or head pose of the subject using the non-PCCR based eye tracker.

6. The eye tracking system according to claim 5, wherein movement of the at least one second eye position of the subject in the image set is tracked using the non-PCCR based eye tracker when the PCCR based eye tracker is unable to track movement of the at least one first eye position.

7. The eye tracking system according to claim 6, wherein the PCCR based eye tracker is determined to be unable to track movement of the at least one first eye position based at least on one of the following: by no glints being obtainable by the PCCR based eye tracker; more glints being obtainable by the PCCR based eye tracker than the number of illuminators illuminating an eye of the subject; and an illuminator pattern, introduced by the positions of the illuminators illuminating the eye, does not match a pattern of the glints in the eye of the subject.

8. The eye tracking system according to claim 1, wherein the field of view of the PCCR eye tracker is defined by a slightly irregular shape.

9. The eye tracking system according to claim 1, wherein positioning the head model to match its at least one second eye position to the at least one first eye position given by the PCCR based eye tracker involves any of rotating, translating, and/or scaling the head model.

10. The eye tracking system according to claim 1, wherein calibrating the head model involves updating geometry parameters of the facial features.

11. A vehicle comprising the eye tracking system according to claim 1, wherein the subject is a driver or a passenger of the vehicle.

12. An eye tracking system, the eye tracking system comprising a pupil centre corneal reflection (PCCR) based eye tracker and a non-PCCR based eye tracker, wherein the PCCR based eye tracker is unable to track movement of a at least one first eye position when the subject gazes at points located outside a circle, wherein the PCCR based eye tracker is used to track movement of a at least one first eye position of the subject when the subject gazes at points located inside the circle, and wherein the non-PCCR based eye tracker is used to track movement of a at least one second eye position of the subject when the subject gazes at points located outside the circle, the eye tracking system further comprising:
 an obtain module configured to obtain at least one first eye position of a subject by applying the PCCR based eye tracker on an image set depicting the subject; and
 a calibrate module configured to calibrate a head model of the non-PCCR based eye tracker, as applied on the image set, for the subject using the obtained at least one first eye position from the PCCR based eye tracker as ground truth, wherein the head model comprises facial features that include at least one second eye position, and wherein the calibrating involves positioning the head model in order for its at least one second eye position to be consistent with the at least one first eye position given by the PCCR based eye tracker.

13. A vehicle comprising the eye tracking system according to claim 12, wherein the subject is a driver or a passenger of the vehicle.

14. A method for calibration of an eye tracking system, the eye tracking system comprising a pupil centre corneal reflection (PCCR) based eye tracker and a non-PCCR based eye tracker, wherein the PCCR based eye tracker is unable to track movement of a at least one first eye position when the subject gazes at points located outside a circle, wherein the PCCR based eye tracker is used to track movement of a at least one first eye position of the subject when the subject gazes at points located inside the circle, and wherein the non-PCCR based eye tracker is used to track movement of a at least one second eye position of the subject when the subject gazes at points located outside the circle, the method comprising:

obtaining at least one first eye position of a subject by applying the PCCR based eye tracker on an image set depicting the subject; and
 calibrating a head model of the non-PCCR based eye tracker, as applied on the image set, for the subject using the obtained at least one first eye position from the PCCR based eye tracker as ground truth, wherein the head model comprises facial features that include at least one second eye position, and wherein the calibrating involves positioning the head model in order for its at least one second eye position to be consistent with the at least one first eye position given by the PCCR based eye tracker.

15. The method according to claim 14, further comprising:
 calculating gaze of the subject in the image set using the PCCR based eye tracker or the non-PCCR based eye tracker.

16. The method according to claim 15, further comprising:
 tracking movement of the at least one first eye position of the subject in the image set using the PCCR based eye tracker,
 wherein the gaze of the subject is calculated using the tracked movement of the at least one first eye position of the subject using the PCCR based eye tracker.

17. The method according to claim 15, further comprising:
 tracking movement of the at least one second eye position of the subject in the image set using the non-PCCR based eye tracker,
 wherein the gaze of the subject is calculated using the tracked movement of the at least one second eye position and/or head pose of the subject using the non-PCCR based eye tracker.

18. A computer program product comprising a computer program and a non-transitory computer readable storage medium on which the computer program is stored, wherein the computer program is for calibration of an eye tracking system, the eye tracking system comprising a pupil centre corneal reflection (PCCR) based eye tracker and a non-PCCR based eye tracker, wherein the PCCR based eye tracker is unable to track movement of a at least one first eye position when the subject gazes at points located a field of view of the PCCR based eye tracker, wherein the PCCR based eye tracker is used to track movement of a at least one first eye position of the subject when the subject gazes at points located inside the field of view of the PCCR based eye tracker, and wherein the non-PCCR based eye tracker is used to track movement of a at least one second eye position of the subject when the subject gazes at points located outside the field of view of the PCCR based eye tracker, the computer program comprising computer code which, when run on processing circuitry of the eye tracking system, causes the eye tracking system to:
 obtain at least one first eye position of a subject by applying the PCCR based eye tracker on an image set depicting the subject; and
 calibrate a head model of the non-PCCR based eye tracker, as applied on the image set, for the subject using the obtained at least one first eye position from the PCCR based eye tracker as ground truth, wherein the head model comprises facial features that include at least one second eye position, and wherein the calibrating involves positioning the head model in order for its at least one second eye position to be consistent with the at least one first eye position given by the PCCR based eye tracker.

\* \* \* \* \*